US012643383B2

(12) United States Patent (10) Patent No.: US 12,643,383 B2
Dogahira et al. (45) Date of Patent: Jun. 2, 2026

(54) VEHICLE FLUID CONTROLLER

(71) Applicant: SUBARU CORPORATION, Tokyo (JP)

(72) Inventors: Yusaku Dogahira, Tokyo (JP); Naoto Watanabe, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 505 days.

(21) Appl. No.: 18/125,828

(22) Filed: Mar. 24, 2023

(65) Prior Publication Data

US 2023/0322061 A1 Oct. 12, 2023

(30) Foreign Application Priority Data

Apr. 6, 2022 (JP) .................................. 2022-063535

(51) Int. Cl.
B60J 7/22 (2006.01)
F15D 1/00 (2006.01)
(52) U.S. Cl.
CPC .............. B60J 7/22 (2013.01); F15D 1/0075 (2013.01)
(58) Field of Classification Search
CPC . B60J 7/22; B60J 7/043; F15D 1/0075; F15D 1/12; Y02T 10/92; Y10S 180/903; B62D 37/02
See application file for complete search history.

(56) References Cited

U.S. PATENT DOCUMENTS

| | | | | |
|---|---|---|---|---|
| 7,735,910 B2 * | 6/2010 | Ramsay | ..................... | B60J 7/22 |
| | | | | 296/217 |
| 8,303,024 B2 * | 11/2012 | Alvi | ........................... | B60J 9/04 |
| | | | | 296/180.1 |
| 9,821,862 B2 * | 11/2017 | Han | ........................ | B62D 35/00 |
| 9,849,766 B1 * | 12/2017 | MacLean | ................... | B60J 7/22 |
| 10,011,344 B1 * | 7/2018 | Santavicca, Jr. | ...... | B64C 23/005 |
| 10,239,475 B2 * | 3/2019 | Barnes, III | ............. | B62D 35/00 |
| 10,339,910 B2 * | 7/2019 | Valeri | .................... | G10K 11/16 |
| 10,495,121 B2 * | 12/2019 | Smullin | ................ | B64C 23/005 |

(Continued)

FOREIGN PATENT DOCUMENTS

| | | | | |
|---|---|---|---|---|
| DE | 102016001899 A1 * | 8/2017 | ......... | B60H 1/00407 |
| JP | H03-248917 A | 11/1991 | | |

(Continued)

OTHER PUBLICATIONS

Office Action issued in Japanese Patent Application No. 2022-063535 dated Oct. 28, 2025 (including English translation).

*Primary Examiner* — Steve Clemmons

(74) *Attorney, Agent, or Firm* — TROUTMAN PEPPER LOCKE LLP

(57) ABSTRACT

A vehicle fluid controller to be applied to a vehicle. The vehicle fluid controller includes a jet generator, a wind detector, and a jet controller. The jet generator is configured to generate a jet of air and is disposed at an edge of a vehicle-body opening through which a vehicle cabin of the vehicle is allowed to be open to an outside of the vehicle. The wind detector is configured to detect a speed and a direction of wind acting on the vehicle body of the vehicle. The jet controller is configured to control the jet from the jet generator in accordance with the speed and the direction of the wind in such a manner as to disturb an airflow passing over the vehicle-body opening along a surface of the vehicle body.

7 Claims, 9 Drawing Sheets

(56) References Cited

U.S. PATENT DOCUMENTS

| | | | | |
|---|---|---|---|---|
| 11,639,203 B2 * | 5/2023 | Watanabe | .............. | B62D 35/00 |
| | | | | 296/180.1 |
| 2005/0282485 A1 * | 12/2005 | Kato | ..................... | B60H 1/243 |
| | | | | 454/136 |
| 2008/0122252 A1 * | 5/2008 | Corke | ................. | H05H 1/2439 |
| | | | | 296/180.1 |
| 2013/0306177 A1 * | 11/2013 | Bonutti | .................. | F02M 27/08 |
| | | | | 137/803 |
| 2021/0094631 A1 * | 4/2021 | Watanabe | ................. | F15D 1/10 |
| 2021/0094632 A1 * | 4/2021 | Watanabe | ............ | B62D 35/005 |
| 2021/0094633 A1 * | 4/2021 | Watanabe | ............. | F15D 1/0075 |
| 2022/0033013 A1 | 2/2022 | Watanabe et al. | | |

FOREIGN PATENT DOCUMENTS

| | | | | | |
|---|---|---|---|---|---|
| JP | 2007-276574 A | | 10/2007 | | |
| JP | 2008174128 A | * | 7/2008 | | |
| JP | 2022-026371 A | | 2/2022 | | |
| JP | 2022-053275 A | | 4/2022 | | |
| KR | 20030006375 A | * | 1/2003 | | |
| KR | 100802412 B1 | * | 2/2008 | ............. | B62D 25/06 |
| WO | WO-2014130425 A1 | * | 8/2014 | ............. | B62D 35/00 |

* cited by examiner

VEHICLE FLUID CONTROLLER

CROSS-REFERENCE TO RELATED APPLICATION

The present application claims priority from Japanese Patent Application No. 2022-063535 filed on Apr. 6, 2022, the entire contents of which are hereby incorporated by reference.

BACKGROUND

The disclosure relates to a vehicle fluid controller to be applied to a vehicle and configured to reduce noise generated by wind at a vehicle-body opening through which the vehicle cabin is allowed to be open to the outside of the vehicle.

Some of hitherto known vehicles such as automobiles have sunroofs at the roofs of the bodies thereof. When such a vehicle is traveling at a low speed with the roof opening open, low-frequency noise called wind throb may be generated. To reduce the generation of wind throb, such a vehicle is in general provided with a wind deflector. The wind deflector is made to stand upright when the roof opening is opened, thereby reducing the impact of vortices (currents) of air on the edge of the roof opening. Thus, the occurrence of wind throb is reduced.

On the other hand, when the above vehicle is traveling at a high speed with the wind deflector standing upright, wind noise is generated. The generation of wind noise is pronounced if the wind deflector of the vehicle has an opening or the like intended to reduce wind throb.

In view of the above, a wind deflector device including a shutter configured to open and close an opening (through-hole) provided in a wind deflector is disclosed by Japanese Unexamined Patent Application Publication (JP-A) No. 2007-276574, for example. The device disclosed by JP-A No. 2007-276574 is intended to reduce both wind throb and wind noise by opening or closing the opening in accordance with the range of vehicle speed.

SUMMARY

An aspect of the disclosure provides a vehicle fluid controller to be applied to a vehicle. The vehicle fluid controller includes at least one jet generator, a wind detector, and a jet controller. The least one jet generator is configured to generate a jet of air and is disposed at an edge of a vehicle-body opening through which a vehicle cabin of the vehicle is allowed to be open to an outside of the vehicle. The wind detector is configured to detect a speed and a direction of wind acting on a vehicle body of the vehicle. The jet controller is configured to control the jet from the at least one jet generator in accordance with the speed and the direction of the wind in such a manner as to disturb an airflow passing over the vehicle-body opening along a surface of the vehicle body.

An aspect of the disclosure provides a vehicle fluid controller to be applied to a vehicle. The vehicle fluid controller includes circuitry. The circuitry is configured to generate a jet of air. The jet is ejected from an edge of a vehicle-body opening through which a vehicle cabin of the vehicle is allowed to be open to an outside of the vehicle. Furthermore, the circuitry is configured to detect a speed and a direction of wind acting on a vehicle body of the vehicle. Furthermore, the circuitry is configured to control the jet in accordance with the speed and the direction of the wind in such a manner as to disturb an airflow passing over the vehicle-body opening along a surface of the vehicle body.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to describe the principles of the disclosure.

DETAILED DESCRIPTION

In the device disclosed by JP-A No. 2007-276574, the generation of wind noise is reduced by closing the opening. Nevertheless, the device includes the wind deflector, which is a source of wind noise. Therefore, it is still difficult to increase both the effect of reducing wind throb and the effect of reducing wind noise.

Moreover, the wind deflector disposed at the sunroof of the vehicle body, such as the one disclosed by JP-A No. 2007-276574, may deteriorate the appearance of the vehicle body.

It is desirable to provide, without deteriorating the appearance of the vehicle body, a vehicle fluid controller configured to reduce noise generated by the airflow at a vehicle-body opening through which the vehicle cabin is allowed to be open to the outside of the vehicle.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
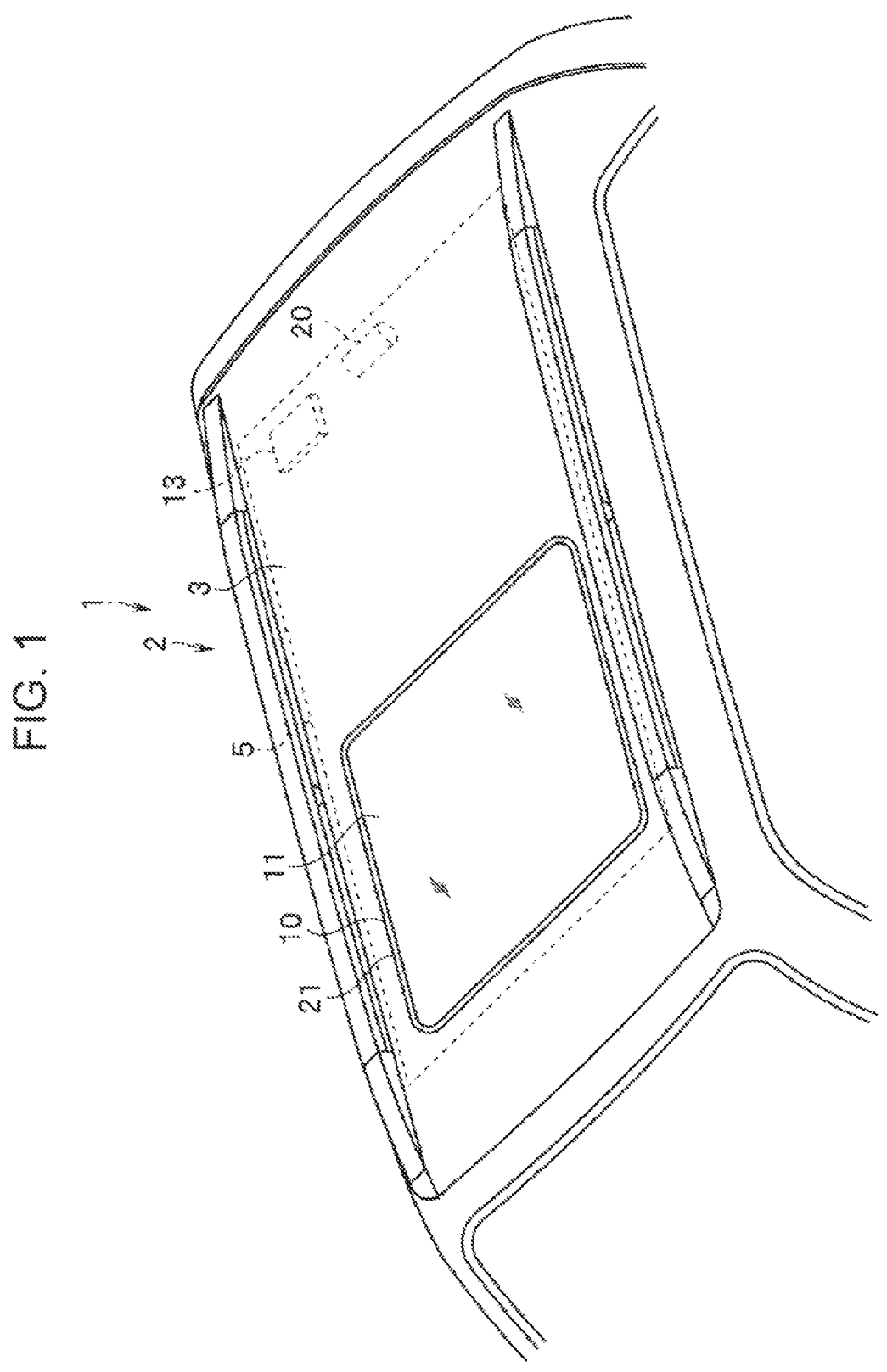
FIG. 1 is an upper perspective view of a vehicle body with a sunroof thereof closed.
Figure 2:
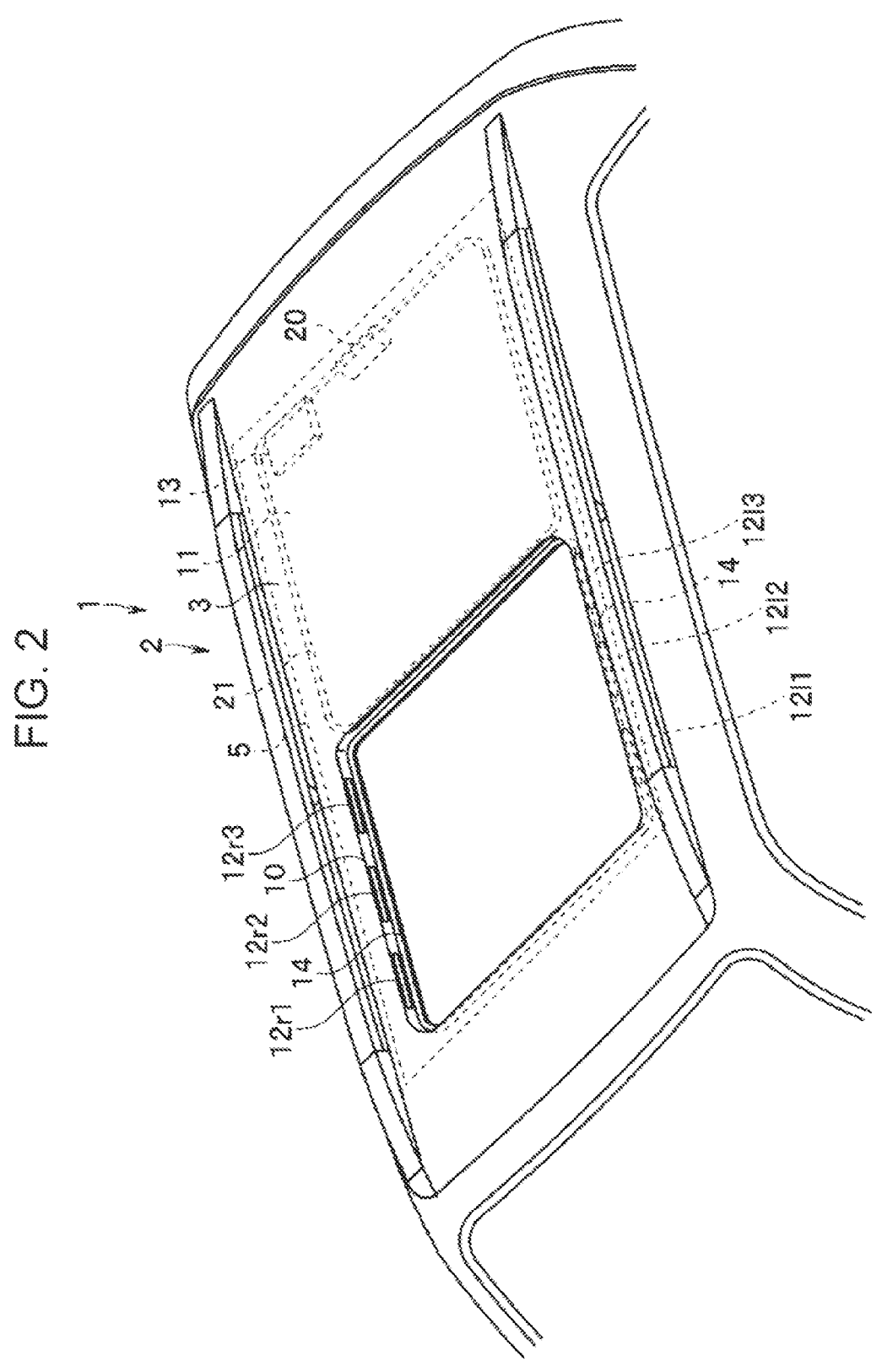
FIG. 2 is an upper perspective view of the vehicle body with the sunroof thereof open.

FIG. 1 is an upper perspective view of a vehicle body with a sunroof thereof closed. FIG. 2 is an upper perspective view of the vehicle body with the sunroof thereof open.

Referring to FIGS. 1 and 2, a vehicle 1 includes a vehicle body 2, at the top of which a roof panel 3 is provided. The roof panel 3 is provided with a sunroof device 5.

The roof panel 3 has a roof opening 10, which may serve as a "vehicle-body opening" in one embodiment. The sunroof device 5 includes a movable roof panel 11, plasma actuators 12, and an integrated vehicle-body control unit (hereinafter referred to as "integrated ECU") 13. The movable roof panel 11 is intended to open and close the roof opening 10. The plasma actuators 12 may each serve as a "jet generator" in one embodiment.

The roof opening 10 has, for example, a rectangular shape and allows the vehicle cabin to be open to the outside of the vehicle 1. On the left and right sides of the roof opening 10 are disposed respective guide rails 14, which each project toward the inner side of the roof opening 10 (see FIG. 2). The guide rails 14 guide the movable roof panel 11 that opens and closes the roof opening 10.

The movable roof panel 11 is, for example, a rectangular glass plate. The movable roof panel 11 is coupled to a panel motor 20 through a panel-driving mechanism (not illustrated). The panel motor 20 is disposed inside the roof panel 3.

Thus, the movable roof panel 11 is movable back and forth along the guide rails 14 continuously between an emerged position (see FIG. 1), where the roof opening 10 is closed, and a retracted position (see FIG. 2), where the roof opening 10 is open.

The movable roof panel 11 is provided therearound with a resin seal 21. When the movable roof panel 11 is at the emerged position, the seal 21 fluid-tightly seals the roof opening 10.

A combination of the plasma actuators 12, the integrated ECU 13, and other relevant elements forms a fluid controller 7 (see FIG. 5) for the vehicle 1.

Figure 3:
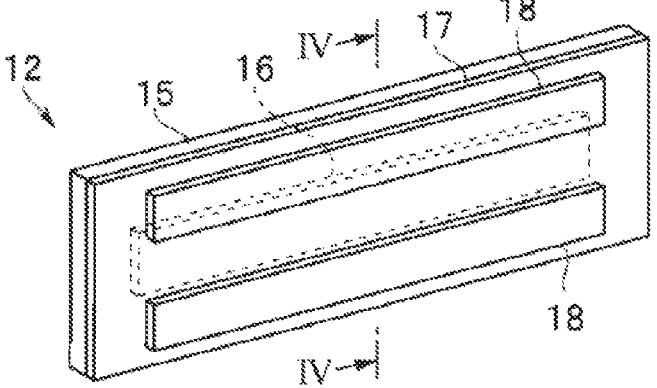
FIG. 3 is a perspective view of one of the plasma actuators.
Figure 4:
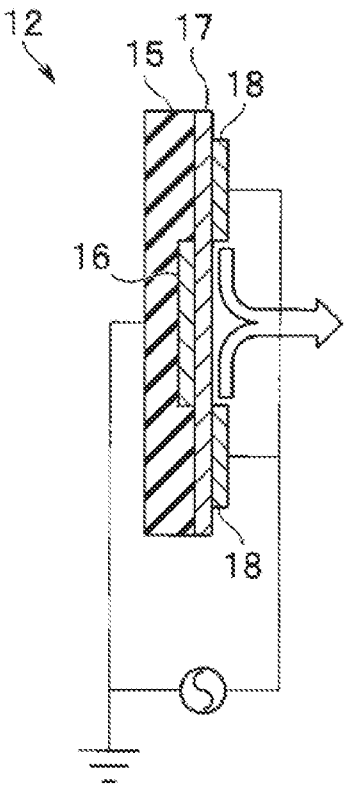
FIG. 4 illustrates a section taken along line IV-IV given in FIG. 3.

Referring to FIGS. 3 and 4, each of the plasma actuators 12 includes an insulating substrate 15, which is a soft sheet; a lower electrode 16, which is disposed on the insulating substrate 15; a dielectric layer 17, which overlies the lower electrode 16; and a pair of upper electrodes 18, which are disposed on the outer surface of the dielectric layer 17. The pair of upper electrodes 18 do not overlap the lower electrode 16 in the thickness direction of the insulating substrate 15. The pair of upper electrodes 18 are located on two respective sides of the lower electrode 16 that are opposite each other.

A high voltage at a high frequency is to be applied between the lower electrode 16 and the pair of upper electrodes 18 of the plasma actuator 12. With the application of the high voltage, each of the upper electrodes 18 generates a jet of air from one of the edges thereof that is in proximity to the lower electrode 16. The jets generated by the upper electrodes 18 flow along the surface of the dielectric layer 17 and then merge together. Thus, the plasma actuator 12 generates a jet traveling in a direction intersecting the insulating substrate 15 (for example, in a direction orthogonal to the insulating substrate 15).

The plasma actuators 12 each configured as above are provided, for example, three each at the left and right edges of the roof opening 10 and side by side in the front-rear direction of the vehicle body 2. The plasma actuators 12 are pasted to, for example, walls defining the left and right sides of the roof opening 10. Accordingly, the plasma actuators 12 are each capable of generating a jet toward the inner side of the roof opening 10.

In the following description, the plasma actuators 12 are occasionally distinguished from one another with different reference signs: in FIGS. 2 and 5, for example, the plasma actuators 12 disposed at the left edge of the roof opening 10 are denoted by "1211", "1212", and "1213" from the front side; and the plasma actuators 12 disposed on the right edge of the roof opening 10 are denoted by "12$r$1", "12$r$2", and "12$r$3" from the front side.

The integrated ECU 13 is configured to control the opening and closing of the movable roof panel 11 and the driving of the individual plasma actuators 12.

Figure 5:
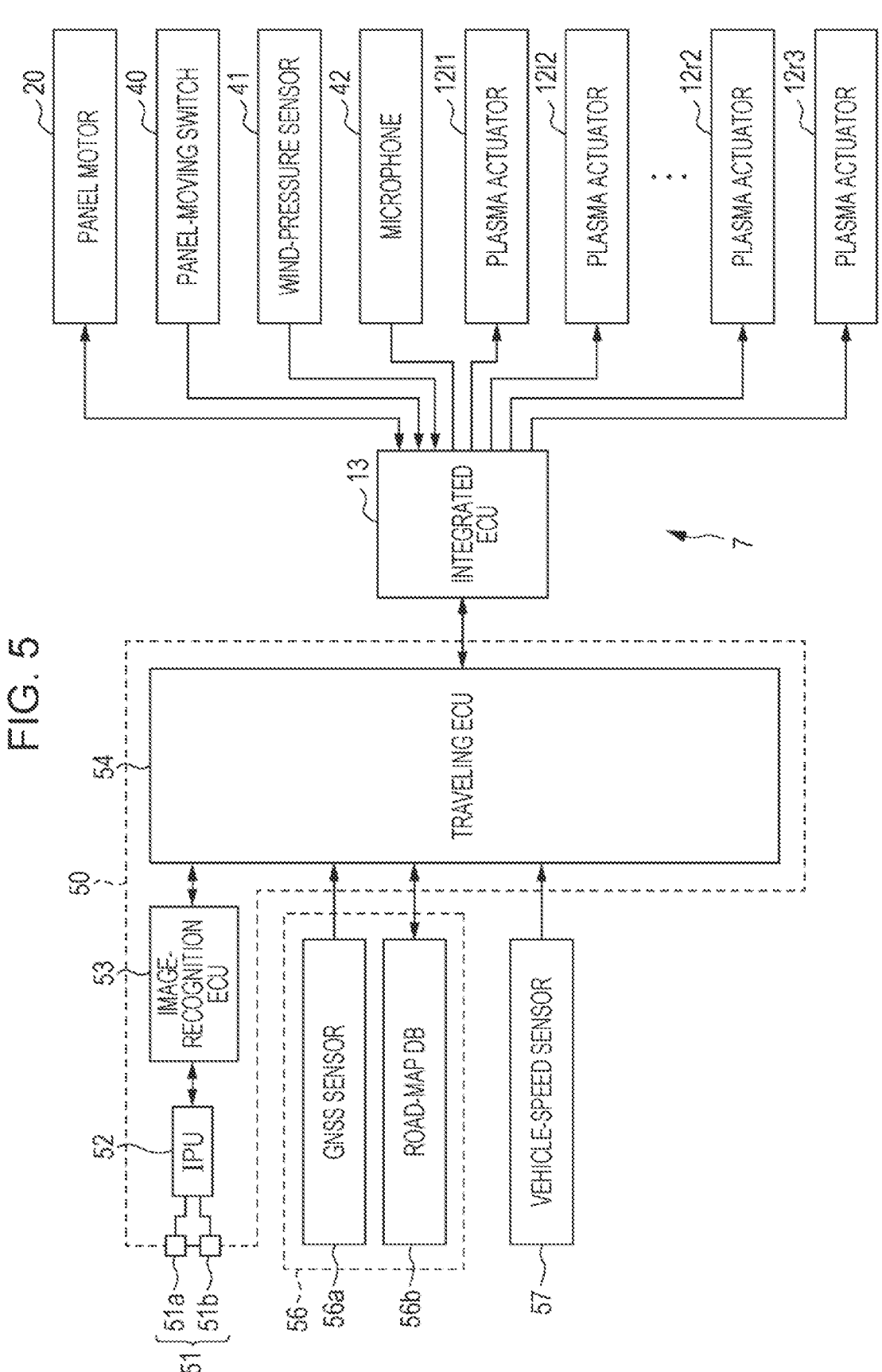
FIG. 5 is a block diagram of a fluid controller.

Referring to FIG. 5, the integrated ECU 13 configured to control the above elements is coupled to, for example, a panel-moving switch 40, a wind-pressure sensor 41, and a microphone 42.

The panel-moving switch 40 is disposed at, for example, a position near the driver's seat in the vehicle cabin.

The wind-pressure sensor 41 is, for example, a combination of multiple pressure sensors. The wind-pressure sensor 41 is disposed on, for example, the front bumper. The pressure sensors included in the wind-pressure sensor 41 are to receive a pressure generated by the wind, whereby the wind-pressure sensor 41 detects the speed (pressure) and the direction of the wind acting on the vehicle body 2. The wind-pressure sensor 41 may serve as a "wind detector" in one embodiment.

The microphone 42 is disposed in or on, for example, the headrest of a seat. Thus, the microphone 42 detects noise substantially the same as the noise such as wind throb and wind noise that is heard by the occupant. The microphone 42 may serve as a "noise detector" in one embodiment.

The integrated ECU 13 is further coupled to a traveling control unit (traveling ECU) 54. The traveling ECU 54 is configured to generally control an operation of assisting the driving of the vehicle 1.

The traveling ECU 54 according to the present embodiment is built in a camera unit 50. The camera unit 50 including the traveling ECU 54 further includes a stereo camera 51, an image-processing unit (IPU) 52, and an image-recognition unit (image-recognition ECU) 53. The camera unit 50 is disposed, for example, on an inner upper part of the vehicle cabin and is fixed at the front center of the vehicle cabin.

The stereo camera 51 includes a main camera 51$a$ and a sub camera 51$b$. The main camera 51$a$ and the sub camera 51$b$ are each, for example, a complementary metal-oxide semiconductor (CMOS) device or the like and are disposed at bilaterally symmetrical positions with respect to the center of the vehicle 1 in the vehicle-width direction. The main camera 51$a$ and the sub camera 51$b$ are configured to take a stereo image of the traveling environment in front of the vehicle 1 by taking respective, i.e., left and right, images from the respective positions but simultaneously in a predetermined imaging cycle.

The left and right images of the traveling environment that are taken by the stereo camera 51 is processed by the IPU 52 as predetermined, and the IPU 52 detects the edges of relevant figures, such as solid objects and lane lines on the road, expressed in the left and right images. Furthermore, the IPU 52 obtains range information from the amount of displacement between the detected edges in the left and right images that correspond to each other. Thus, the IPU 52 generates image information including range information (range-image information).

The image-recognition ECU 53 receives the range-image information and so forth transmitted from the IPU 52. In accordance with such information, the image-recognition ECU 53 calculates the road curvature [1/m] and the lane width that are defined by the lane lines on the left and right sides of the lane (course) in which the vehicle 1 is traveling. The image-recognition ECU 53 further calculates the road curvature [1/m] and the lane width that are defined by the lane lines on the left and right sides of, for example, a lane adjacent to the lane in which the vehicle 1 is traveling. There are various known methods of calculating the road curvature and the lane width. For example, the image-recognition ECU 53 recognizes the left and right lane lines through binarization of brightness difference based on information on the traveling environment and calculates the road curvature from the curvatures of the left and right lane lines that are calculated through least-squares curve approximation or the like performed at predetermined intervals. Furthermore, the image-recognition ECU 53 calculates the lane width from the difference between the curvatures of the left and right lane lines.

In accordance with the curvatures of the left and right lane lines and the lane width, the image-recognition ECU 53 calculates the lane center, the deviation in the vehicle lateral position, and so forth. Herein, the deviation in the vehicle lateral position refers to the distance from the lane center to the center of the vehicle 1 in the vehicle-width direction.

The image-recognition ECU 53 further performs predetermined pattern matching or the like on the range-image information. Thus, the image-recognition ECU 53 recognizes solid objects such as guardrails, fences, and curbs that are present along the road; and other vehicles. Examples of the information obtained in the recognition of solid objects by the image-recognition ECU 53 include the types of the solid objects, the distances to the solid objects, the speeds of the solid objects, and the relative speed between the solid objects and the vehicle 1.

Such pieces of information recognized by the image-recognition ECU 53 are transmitted as traveling-environment information to the traveling ECU 54.

In one embodiment, a combination of the image-recognition ECU 53, the stereo camera 51, and the IPU 52 may serve as a "traveling-environment recognizer" configured to recognize traveling-environment information, which is information on the traveling environment outside the vehicle 1.

The traveling ECU 54 is coupled to sensors including a locator unit 56 and a vehicle-speed sensor 57. The vehicle-speed sensor 57 may serve as a "vehicle-speed detector" configured to detect the vehicle speed, V, of the vehicle 1.

The locator unit 56 includes a global-navigation-satellite-system (GNSS) sensor 56a and a high-precision road-map database (road-map DB) 56b.

The GNSS sensor 56a is configured to measure the position (latitude, longitude, altitude, and the like) of the vehicle 1 by receiving positioning signals transmitted from positioning satellites.

The road-map DB 56b is a large-capacity storage medium such as a hard disk drive (HDD). The road-map DB 56b stores high-precision road-map information (dynamic map). Examples of the road-map information include pieces of lane data to be used in autonomous driving: data on the lane width, data on the position coordinates of the lane center, data on the angle of traveling direction of the lane, and data on speed limit. The lane data stored is provided for each of the lanes in the road map and at intervals of several meters. The road-map information stored further includes information on road type (expressway or other roads) and on the category of ground surface roughness (coastal area, rural area, urban area, or other areas).

The road-map DB 56b receives, for example, a request signal from the traveling ECU 54. In response to the request signal, the road-map DB 56b transmits to the traveling ECU 54 traveling-environment information represented by pieces of road-map information that are within a range determined with reference to the position of the vehicle 1 that is measured by the GNSS sensor 56a.

In one embodiment, a combination of the road-map DB 56b and the GNSS sensor 56a may serve as a "traveling-environment recognizer" configured to recognize traveling-environment information.

The traveling ECU 54 coupled to the integrated ECU 13 is further coupled to control units (not illustrated) including an engine control unit (E/G ECU), a transmission control unit (T/M ECU), a brake control unit (BK ECU), and a power-steering control unit (PS ECU) through an in-vehicle communication line such as a controller area network (CAN).

The traveling ECU 54 controls the above ECUs to realize functions such as adaptive cruise control (ACC) and active lane keep centering (ALKC).

The integrated ECU 13 controls the opening and closing of the movable roof panel 11 by controlling the driving of the panel motor 20. In more detail, the integrated ECU 13 controls the driving of the panel motor 20 in accordance with an operation signal that is issued when the panel-moving switch 40 is operated by an occupant. Thus, the integrated ECU 13 controls the position of the movable roof panel 11 relative to the roof opening 10.

The integrated ECU 13 further controls the driving of the individual plasma actuators 12. The driving of the individual plasma actuators 12 is basically controlled in accordance with the wind speed and the wind direction relative to the vehicle 1 that are detected by the wind-pressure sensor 41. Instead of the wind speed detected by the wind-pressure sensor 41, the wind speed assumed from the vehicle speed V (for example, the speed of the wind generated by traveling) may be used. In one embodiment, a combination of the vehicle-speed sensor 57 and the wind-pressure sensor 41 may serve as a "wind detector".

Figure 6:
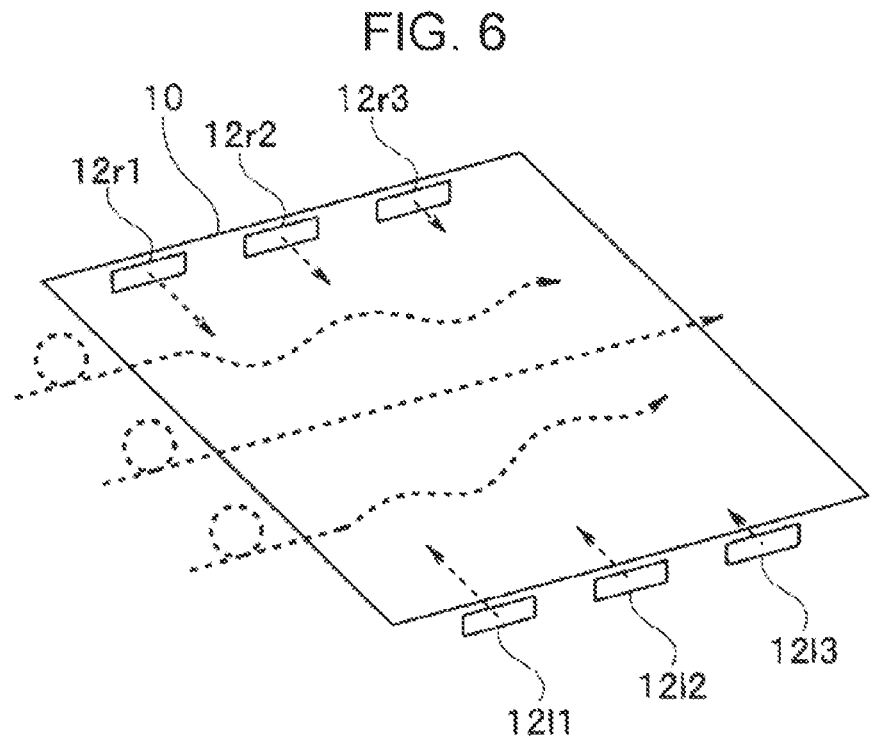
FIG. 6 illustrates how jets are controlled relative to an airflow traveling from the front side of the vehicle body and passing over a roof opening.

For example, referring to FIG. 6, if the airflow (wind) generated along the vehicle 1 travels in substantially the front-rear direction of the vehicle 1 from the front side toward the rear side of the vehicle 1 (see the bold broken lines in FIG. 6), the integrated ECU 13 controls the plasma actuators 12 to generate jets in an even distribution in the left-right direction. In more detail, the integrated ECU 13 controls the plasma actuators 12 such that the levels of intensity of the jets are equal between each of the pairs of left and right plasma actuators 1211 and 12r1, plasma actuators 1212 and 12r2, and plasma actuators 1213 and 12r3.

In such a case, the integrated ECU 13 variably controls the intensity of the individual jets from the plasma actuators 12 in accordance with the wind speed.

Furthermore, the integrated ECU 13 controls the individual plasma actuators 12 such that, for example, the jets become weaker toward the rear side of the roof opening 10. In more detail, the integrated ECU 13 controls the jets from the plasma actuators 1212 and 12r2 to be weaker than the jets from the plasma actuators 1211 and 12r1. Furthermore, the integrated ECU 13 controls the jets from the plasma actuators 1213 and 12r3 to be weaker than the jets from the plasma actuators 1212 and 12r2.

In the above control operation, the airflow passing over the roof opening 10 is disturbed in different manners at different positions relative to the roof opening 10 (at different lateral positions in the roof opening 10). With such turbulence, the timing when the airflow passing over the roof opening 10 impacts on the rear edge of the roof opening 10 is varied with the position in the vehicle-width direction. Thus, the occurrence of wind throb is reduced.

Figure 7:
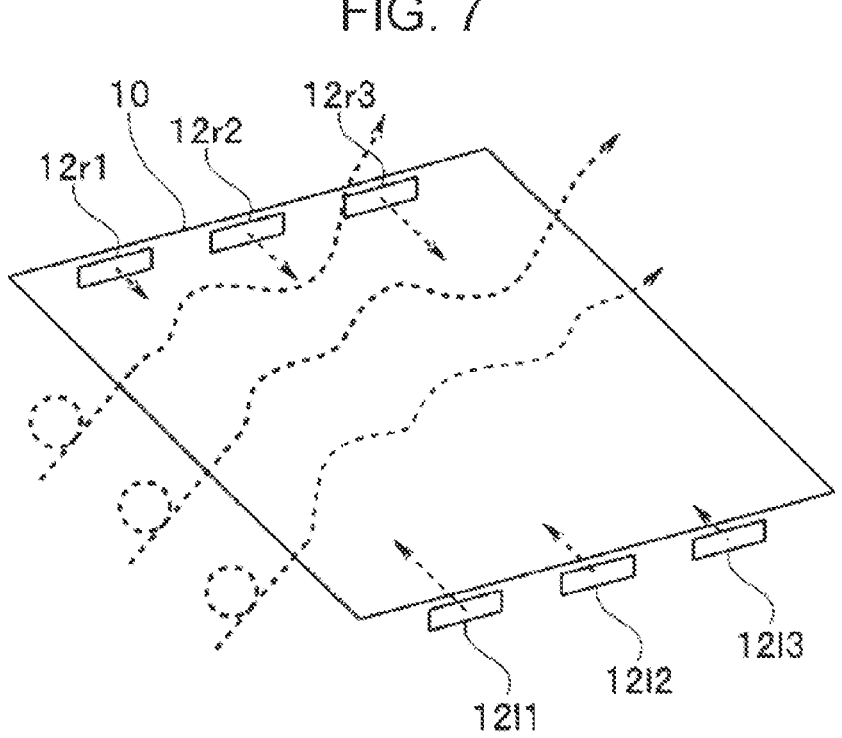
FIG. 7 illustrates how jets are controlled relative to an airflow traveling from the front-left side of the vehicle body and passing over the roof opening.

As another example, referring to FIG. 7, if the airflow (wind) generated along the vehicle 1 travels in a direction from the front-left side toward the rear-right side of the vehicle 1 (see the bold broken lines in FIG. 7), the integrated ECU 13 controls the plasma actuators 12 to generate jets in an uneven distribution in the left-right direction. In more detail, the integrated ECU 13 controls the plasma actuators 12 such that the levels of intensity of the jets are different between each of the pairs of left and right plasma actuators 1211 and 12r1, plasma actuators 1212 and 12r2, and plasma actuators 1213 and 12r3.

In such a case, the integrated ECU 13 variably controls the intensity of the individual jets from the plasma actuators 12 in accordance with the wind speed.

Furthermore, the integrated ECU 13 controls the jets from the left plasma actuators 1211, 1212, and 1213 to become weaker toward the rear side of the roof opening 10. On the other hand, the integrated ECU 13 controls the jets from the right plasma actuators 12r1, 12r2, and 12r3 to become stronger toward the rear side of the roof opening 10.

In the above control operation, the airflow passing over the roof opening 10 is disturbed in different manners at different positions relative to the roof opening 10. Such turbulence reduces the probability that a large amount of air may impact on the rear-right corner of the roof opening 10. Thus, the occurrence of wind throb is reduced.

As another example (not illustrated), if the airflow (wind) generated along the vehicle 1 travels in a direction from the front-right side toward the rear-left side of the vehicle 1, the integrated ECU 13 controls the plasma actuators 12 to generate jets in an uneven distribution in the left-right direction.

In such a case, the integrated ECU 13 variably controls the intensity of the individual jets from the plasma actuators 12 in accordance with the wind speed.

Furthermore, the integrated ECU 13 controls the jets from the right plasma actuators 12r1, 12r2, and 12r3 to become weaker toward the rear side of the roof opening 10. On the other hand, the integrated ECU 13 controls the jets from the left plasma actuators 1211, 1212, and 1213 to become stronger toward the rear side of the roof opening 10.

In the above control operation, the airflow passing over the roof opening 10 is disturbed in different manners at different positions relative to the roof opening 10. Such turbulence reduces the probability that a large amount of air may impact on the rear-left corner of the roof opening 10. Thus, the occurrence of wind throb is reduced.

Although other details are not described herein, the jets to be generated by the plasma actuators 12 are individually controlled by the integrated ECU 13 in accordance with the speed and the direction of the wind (airflow) that may flow in various directions relative to the vehicle 1. Values to be used in controlling the individual plasma actuators 12 are set in accordance with the speed and the direction of the wind (airflow) that flows in various directions. Such values are mapped in advance as reference control variables and are stored in a read-only memory (ROM) or the like included in the integrated ECU 13. The reference control variables are determined though experiments, simulations, or the like.

Note that if, for example, the noise level of the wind throb detected by the microphone 42 is higher than or equal to a predetermined threshold, the integrated ECU 13 accordingly corrects the reference control variables for the individual plasma actuators 12.

The reference control variables may alternatively be corrected in accordance with traveling-environment information or the like. In more detail, if the vehicle 1 is traveling on an expressway, the way of turbulence of the wind, even flowing in the same direction, varies with the area where the expressway of interest runs: whether the area is an open area with no shielding objects such as fences, a closed area defined between any shielding objects such as fences disposed on the left and right sides, a mixed area with shielding objects such as fences disposed on one side, an area inside a tunnel, or any other area. If the vehicle 1 is traveling on any other road, the way of turbulence of the wind, even flowing in the same direction, varies with the area where the road of interest runs: whether the area is a costal area, a rural area, an urban area, or any other area.

If there is any preceding vehicle in front of the vehicle 1, the way of turbulence of the wind, even flowing in the same direction, varies with the type of the preceding vehicle: whether the preceding vehicle is a truck, a passenger car, a compact car, or a light car; and with the distance to the preceding vehicle.

The integrated ECU 13 may correct the reference control variables in accordance with any of the above conditions.

Values to be used in the correction based on the above conditions are mapped in advance and are stored in the ROM or the like included in the integrated ECU 13. Such correction values are determined though experiments, simulations, or the like.

The integrated ECU 13 may serve as a "jet controller" in one embodiment.

Figure 8:
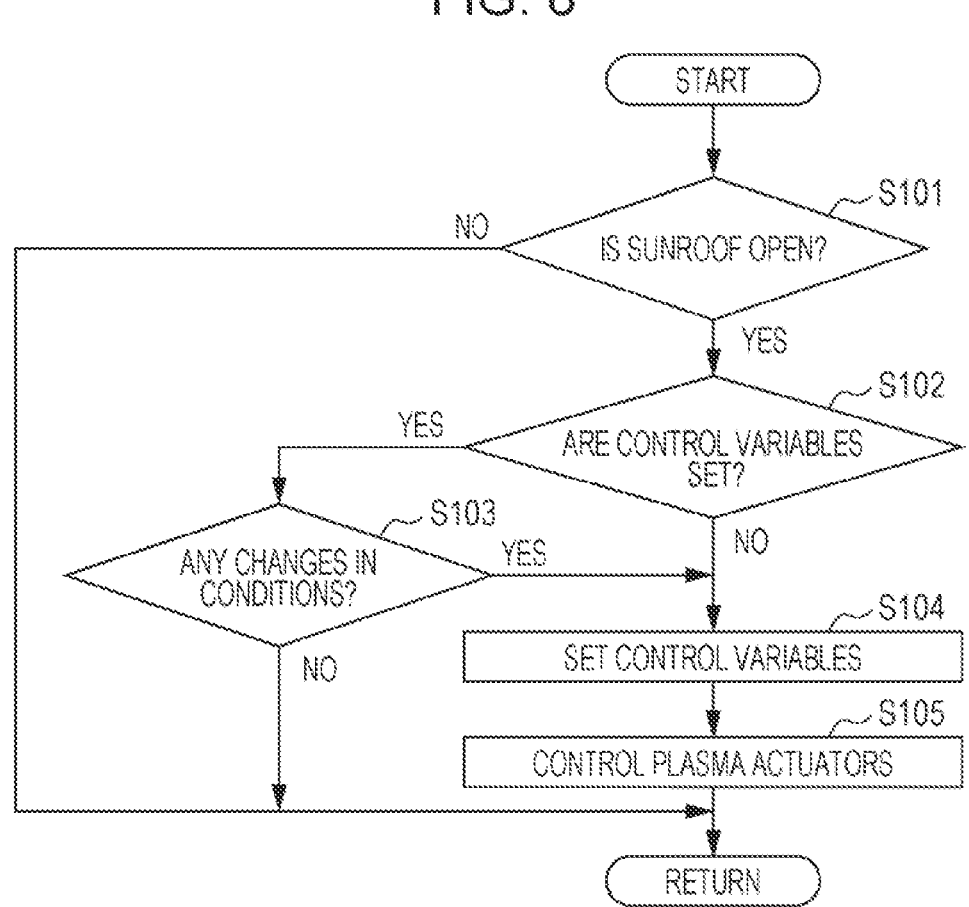
FIG. 8 is a flow chart of a jet-controlling routine.

Now, how to control the jets to be generated by the plasma actuators 12 will be described with reference to the flow chart in FIG. 8, which illustrates a jet-controlling routine. The jet-controlling routine is executed by the integrated ECU 13 repeatedly at preset intervals.

When the routine starts, the integrated ECU 13 executes step S101 to check whether the sunroof is open. In more detail, the integrated ECU 13 checks whether the roof opening 10 is open with the movable roof panel 11 at the retracted position.

If it is determined in step S101 that the sunroof is not open (NO in step S101), the integrated ECU 13 exits the routine.

If it is determined in step S101 that the sunroof is open (YES in step S101), the integrated ECU 13 proceeds to step S102.

In step S102, with the sunroof open, the integrated ECU 13 checks whether the control variables for the plasma actuators 12 are set.

If it is determined in step S102 that the control variables are not set (NO in step S102), the integrated ECU 13 proceeds to step S104.

If it is determined in step S102 that the control variables are set (YES in step S102), the integrated ECU 13 proceeds to step S103.

In step S103, the integrated ECU 13 checks whether there are any changes in the conditions for controlling the plasma actuators 12. In more detail, the integrated ECU 13 checks whether there are any changes in the direction and the speed of the airflow relative to the vehicle 1, the noise level, the traveling environment, and so forth.

If it is determined in step S103 that there are no changes in the conditions for controlling the plasma actuators 12 (NO in step S103), the integrated ECU 13 maintains those conditions for controlling the plasma actuators 12 and exits the routine.

If it is determined in step S103 that there are changes in the conditions for controlling the plasma actuators 12 (YES in step S103), the integrated ECU 13 proceeds to step S104.

When the integrated ECU 13 proceeds from step S102 or step S103 to step S104, the integrated ECU 13 sets the control variables for the individual plasma actuators 12 in accordance with the current control conditions and with reference to the predetermined maps and so forth. In more detail, the integrated ECU 13 calculates the reference control variables for the individual plasma actuators 12 from, for example, the direction and the speed of the airflow relative to the vehicle 1. Furthermore, the integrated ECU 13 calculates the correction values for the reference control variables from the noise level, the traveling environment, and so forth. Then, the integrated ECU 13 corrects the reference control variables by using the calculated correction values, thereby determining the control variables for the individual plasma actuators 12.

If there is any preceding vehicle or the like in front of the vehicle 1, the integrated ECU 13 may cause the plasma actuators 12 to generate jets in a predetermined cycle (for example, a cycle of about 4 Hz) so as to cope with vortices generated periodically from the preceding vehicle or the like. Thus, the cycle of jet generation or the like may be included in the correction values for the reference control variables.

Subsequently, in step S105, the integrated ECU 13 controls the individual plasma actuators 12 in accordance with the control variables determined in step S104. Then, the integrated ECU 13 exits the routine.

According to the embodiment described above, the fluid controller 7 for the vehicle 1 includes the plasma actuators 12 configured to generate jets of air and disposed at an edge of the roof opening 10, the wind-pressure sensor 41 configured to detect the speed and the direction of the wind acting on the vehicle body 2, and the integrated ECU 13 configured to control the jets from the plasma actuators 12 in accordance with the speed and the direction of the wind in such a manner as to disturb an airflow passing over the roof opening 10 along the surface of the vehicle body 2.

Thus, the noise generated by the airflow at the roof opening 10 is reduced without deteriorating the appearance of the vehicle body 2.

In more detail, the fluid controller 7 according to the present embodiment employs a configuration in which noise such as wind throb is reduced with turbulence generated in the airflow by using jets from the plasma actuators 12. Therefore, the roof panel 3 of the vehicle body 2 does not have a member, such as a wind deflector, projecting upward therefrom to reduce the occurrence of wind throb or the like. Consequently, the appearance of the vehicle body 2 is improved. Furthermore, with the omission of the wind deflector that is a source of wind noise, the generation of wind noise is also reduced with no additional measure. Thus, the noise generated by the airflow at the roof opening 10 is reduced.

The arrangement of the plasma actuators 12 at the roof opening 10 may be changed in various ways.

Figure 9:
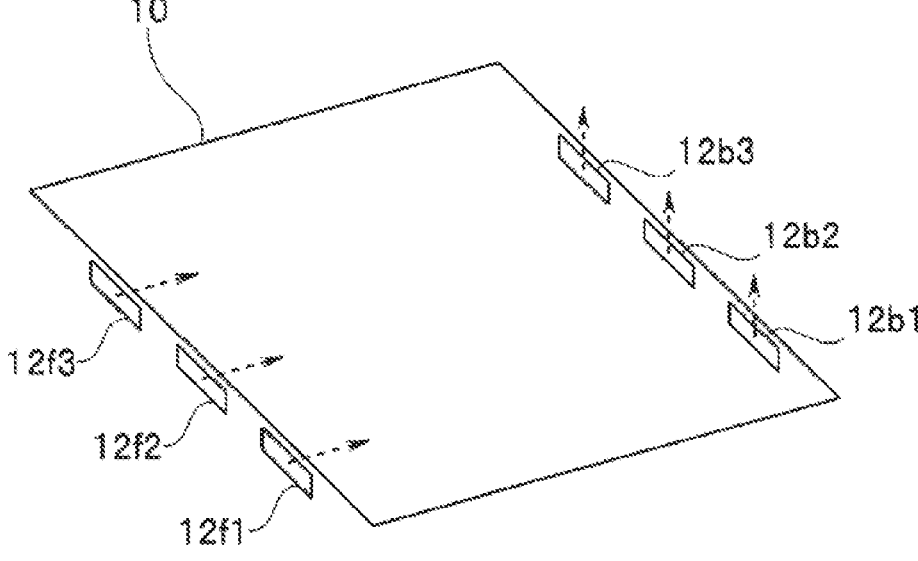
FIG. 9 relates to a first modification and illustrates an exemplary arrangement of plasma actuators relative to the roof opening.

For example, FIG. 9 illustrates another arrangement in which plasma actuators 12f1 to 12f3 are disposed at the front edge of the roof opening 10, and plasma actuators 12b1 to 12b3 are disposed at the rear edge of the roof opening 10.

Figure 10:
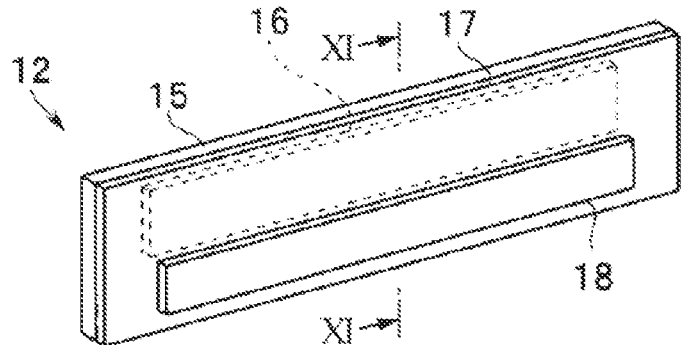
FIG. 10 relates to the first modification and is a perspective view of one of the plasma actuators.
Figure 11:
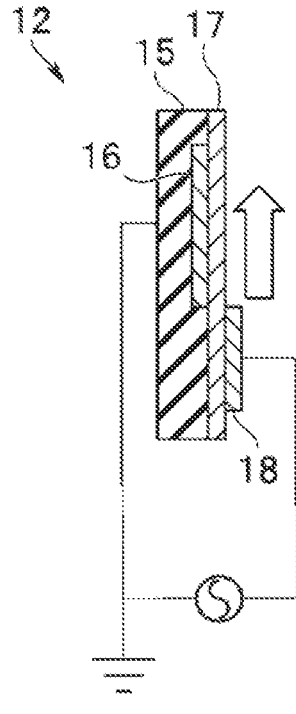
FIG. 11 relates to the first modification and illustrates a section taken along line XI-XI given in FIG. 10.

In such an arrangement, the plasma actuators 12b1 to 12b3 may be configured to generate jets toward the upper side of the roof opening 10. Such a configuration can be realized by, for example, disposing a single upper electrode 18 on the outer surface of the dielectric layer 17 as illustrated in FIGS. 10 and 11.

Figure 12:
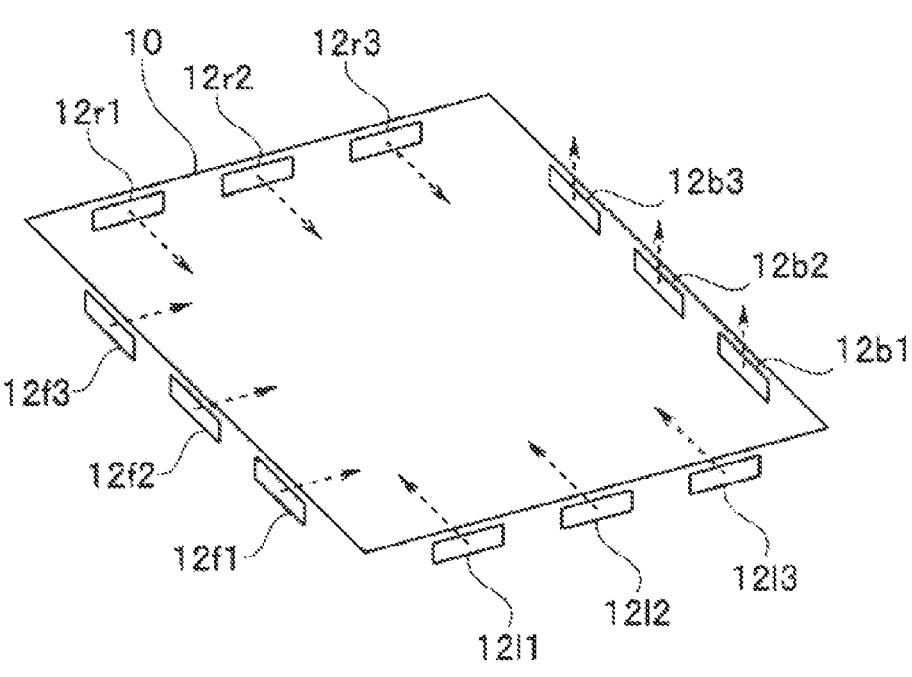
FIG. 12 relates to a second modification and illustrates an exemplary arrangement of the plasma actuators relative to the roof opening.

FIG. 12 illustrates yet another arrangement in which the plasma actuators 12 are disposed at the left and right edges and at the front and rear edges of the roof opening 10.

Figure 13:
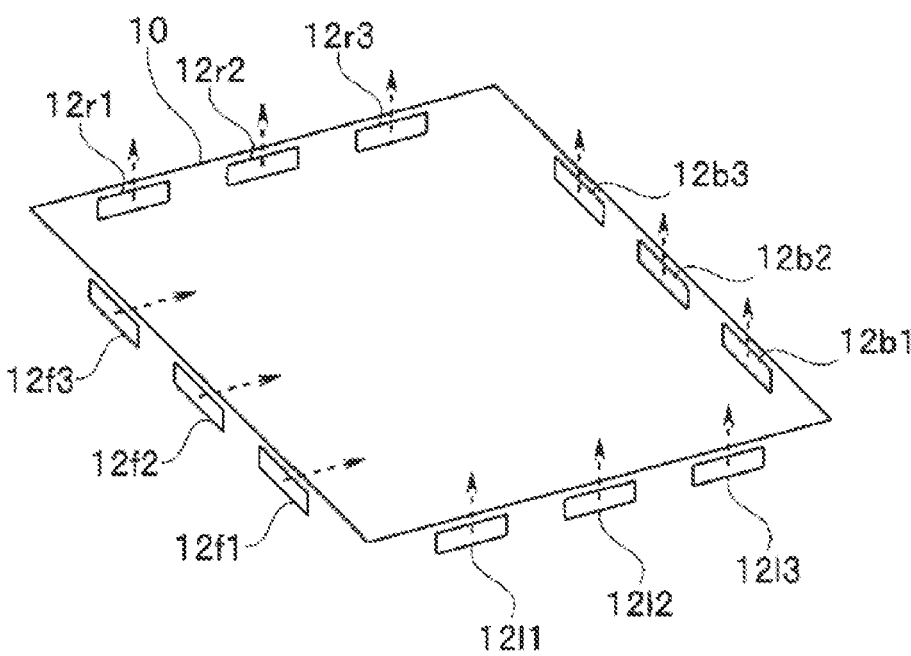
FIG. 13 relates to a third modification and illustrates an exemplary arrangement of the plasma actuators relative to the roof opening.

The directions of the jets from the plasma actuators 12 may be changed in any way. For example, referring to FIG. 13, the left and right plasma actuators 12l1 to 12l3 and 12r1 to 12r3 may generate jets toward the upper side of the roof opening 10.

Figure 14:
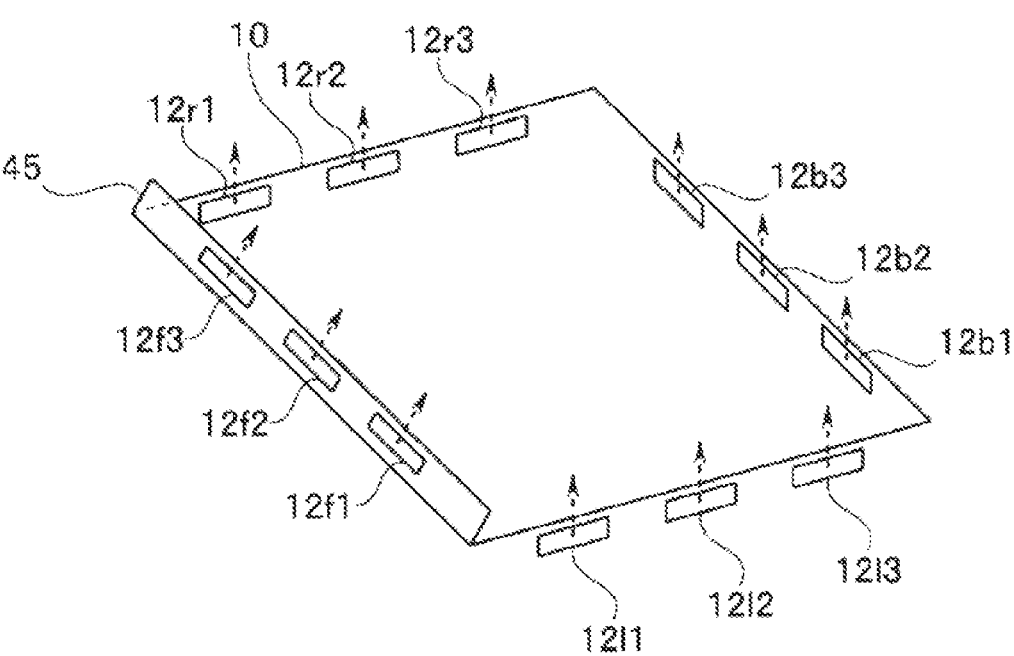
FIG. 14 relates to a fourth modification and illustrates an exemplary arrangement of the plasma actuators relative to the roof opening.

FIG. 14 illustrates yet another arrangement in which plasma actuators 12f1 to 12f3 are disposed on a wind deflector 45 disposed at the front edge of the roof opening 10. Such a wind deflector 45 disposed at the roof opening 10 can have a reduced height by being combined with the plasma actuators 12. Thus, the generation of wind throb is reduced while the quality of appearance of the vehicle body 2 is maintained and the generation of wind noise is reduced.

In the above embodiment, the ECUs including the integrated ECU 13, the image-recognition ECU 53, and the traveling ECU 54 are each formed of a known microcomputer including a CPU, a RAM, a ROM, and a non-volatile storage; and peripheral devices thereof. Programs to be executed by the CPU, fixed data such as data tables, and other relevant data are stored in advance in the ROM. All or some of the functions of the processors included in the ECUs may be configured as logic circuits or analog circuits. Any processing operations for the programs may be performed by electronic circuits such as field-programmable gate arrays (FPGAs).

The disclosure defined by the above embodiments and modifications is not limited thereto and may be embodied with various changes but without departing from the essence of the disclosure.

For example, the plasma actuators may be disposed at door windows or any other locations, in addition to the roof opening. The number of plasma actuators is not limited to those given above.

The above embodiments and modifications involve various stages of the disclosure. Appropriate combinations of any of the features disclosed herein can be extracted as various kinds of invention.

For example, if the problems described above are solved and the effects described above are produced even with the omission of some of the features of the above embodiments, a configuration with such omission can be extracted as an invention.

The integrated ECU 13 illustrated in FIG. 5 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the integrated ECU 13. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 5.

The invention claimed is:

1. A vehicle fluid controller to be applied to a vehicle, the vehicle fluid controller comprising:

at least one jet generator configured to generate a jet of air, the at least one jet generator being disposed at an edge of a vehicle-body opening through which a vehicle cabin of the vehicle is allowed to be open to an outside of the vehicle;

a wind detector configured to detect a speed and a direction of wind acting on a vehicle body of the vehicle; and a jet controller configured to control the jet from the at least one jet generator in accordance with the speed and the direction of the wind in such a manner as to disturb an airflow passing over the vehicle-body opening along a surface of the vehicle body, wherein, the vehicle-body opening is a roof opening, the at least one jet generator comprises jet generators configured to respectively generate jets of air toward an inner side of the roof opening in a vehicle-width direction of the vehicle, and each of the jet generators being disposed along an edge on at least one of two sides of the roof opening in the vehicle-width direction, and the jet controller is configured to control an intensity of each of the jets.

2. The vehicle fluid controller according to claim 1, wherein the at least one jet generator includes a plasma actuator.

3. The vehicle fluid controller according to claim 2, wherein the at least one jet generator further comprises rear jet generators configured to respectively generate jets of air toward an upper side of the vehicle body, each of the rear jet generators being disposed along a rear edge of the roof opening, and the jet controller is configured to control an intensity of each of the jets.

4. The vehicle fluid controller according to claim 2, further comprising:

a traveling-environment recognizer configured to recognize traveling-environment information on a traveling environment outside the vehicle; and a noise detector configured to detect noise that is to be heard in the vehicle cabin, wherein the jet controller is configured to correct a control variable for the jet generator in accordance with the traveling-environment information and a level of the noise.

5. The vehicle fluid controller according to claim 1, wherein the at least one jet generator further comprises rear jet generators configured to respectively generate jets of air toward an upper side of the vehicle body, each of the rear jet generators being disposed along a rear edge of the roof opening, and the jet controller is configured to control an intensity of each of the jets.

6. The vehicle fluid controller according to claim 1, further comprising:

a traveling-environment recognizer configured to recognize traveling-environment information on a traveling environment outside the vehicle; and a noise detector configured to detect noise that is to be heard in the vehicle cabin, wherein the jet controller is configured to correct a control variable for the jet generator in accordance with the traveling-environment information and a level of the noise.

7. A vehicle fluid controller to be applied to a vehicle, the vehicle fluid controller comprising:

circuitry configured to:

cause at least one jet generator to generate a jet of air, wherein the at least one jet generator is disposed at an edge of a vehicle-body opening through which a vehicle cabin of the vehicle is allowed to be open to an outside of the vehicle;

cause a wind detector to detect a speed and a direction of wind acting on a vehicle body of the vehicle; and control the jet from the at least one jet generator in accordance with the speed and the direction of the wind in such a manner as to disturb an airflow passing over the vehicle-body opening along a surface of the vehicle body, wherein, the vehicle-body opening is a roof opening, and the circuitry is further configured to:

control jet generators of the at least one jet generator to respectively generate jets of air toward an inner side of the roof opening in a vehicle-width direction of the vehicle, wherein each of the jet generators is disposed along an edge on at least one of two sides of the roof opening in the vehicle-width direction, and control an intensity of each of the jets.

* * * * *